(12) United States Patent
Jones

(10) Patent No.: US 11,082,944 B2
(45) Date of Patent: Aug. 3, 2021

(54) DETERMINING DEVICE LOCATION

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/821,498

(22) Filed: Mar. 17, 2020

(65) Prior Publication Data

US 2020/0221413 A1 Jul. 9, 2020

Related U.S. Application Data

(63) Continuation of application No. 15/793,776, filed on Oct. 25, 2017, now Pat. No. 10,631,262.

(51) Int. Cl.
| | |
|---|---|
| *H04W 64/00* | (2009.01) |
| *H04B 7/06* | (2006.01) |
| *H04W 4/02* | (2018.01) |
| *H04B 7/08* | (2006.01) |
| *G01S 5/02* | (2010.01) |
| *H04W 16/28* | (2009.01) |
| *H04W 88/08* | (2009.01) |

(Continued)

(52) U.S. Cl.
CPC ......... *H04W 64/003* (2013.01); *G01S 5/0252* (2013.01); *G01S 19/42* (2013.01); *H04B 7/0617* (2013.01); *H04B 7/086* (2013.01); *H04W 4/025* (2013.01); *H04W 16/28* (2013.01); *H04W 64/00* (2013.01); *H04W 88/02* (2013.01); *H04W 88/08* (2013.01)

(58) Field of Classification Search
CPC ... H04W 64/003; H04W 16/28; H04W 4/025; H04W 88/02; H04W 88/08; H04W 64/00; H04B 7/0617; H04B 7/086; G01S 5/0252; G01S 19/42; G01S 1/14; G01S 19/48; G01S 5/12; G01S 3/14
USPC .............. 455/63.4, 404.1, 414.1, 435.1–445, 455/456.1–457, 521; 370/331
See application file for complete search history.

(56) References Cited

U.S. PATENT DOCUMENTS

| | | | |
|---|---|---|---|
| 6,850,761 B2 * | 2/2005 | Pallonen | H04W 64/00 455/437 |
| 9,942,702 B1 * | 4/2018 | McMullen | H04W 64/003 |

(Continued)

OTHER PUBLICATIONS

Non Final Office Action dated Jan. 8, 2019 for U.S. Appl. No. 15/793,776 "Determining Device Location" Jones, 31 pages.

(Continued)

*Primary Examiner* — Michael Y Mapa
(74) *Attorney, Agent, or Firm* — Lee & Hayes, P.C.

(57) ABSTRACT

Certain cellular communication systems may use beamforming to create distinct signal beams in different radial directions relative to a base station. Upon receiving a request for the location of a mobile device, a position calculation function is used to calculate the location of the mobile device based on multiple types of location-related data. The location-related data may indicate the direction of the directional signal beam that is currently being used for communications between the mobile device and a base station. The direction may be used in conjunction with other location-related data, such as distance information, to estimate the location of the mobile device.

20 Claims, 4 Drawing Sheets

(51) Int. Cl.
*H04W 88/02* (2009.01)
*G01S 1/14* (2006.01)
*G01S 19/48* (2010.01)
*G01S 5/12* (2006.01)
*G01S 3/14* (2006.01)
*G01S 19/42* (2010.01)

(56) References Cited

U.S. PATENT DOCUMENTS

| | | | |
|---|---|---|---|
| 2004/0072545 A1* | 4/2004 | Hamalainen | H01Q 1/246 455/101 |
| 2010/0246476 A1 | 9/2010 | Hethuin et al. | |
| 2010/0283678 A1 | 11/2010 | Ketonen | |
| 2012/0258729 A1 | 10/2012 | Siomina et al. | |
| 2014/0302870 A1 | 10/2014 | Cui et al. | |
| 2015/0133173 A1* | 5/2015 | Edge | G01S 1/66 455/456.6 |
| 2016/0047649 A1 | 2/2016 | Edge et al. | |
| 2016/0295366 A1 | 10/2016 | Priyanto et al. | |
| 2017/0195855 A1 | 7/2017 | Na et al. | |
| 2017/0238131 A1 | 8/2017 | Dai et al. | |
| 2017/0273062 A1 | 9/2017 | Liu et al. | |
| 2017/0373739 A1* | 12/2017 | Guo | H04B 7/0404 |
| 2019/0124617 A1 | 4/2019 | Jones | |

OTHER PUBLICATIONS

Office Action for U.S. Appl. No. 15/793,776, dated Feb. 9, 2018, Jones, "Determining Device Location", 29 pages.

Office Action for U.S. Appl. No. 15/793,776, dated Apr. 9, 2019, Jones, "Determining Device Location", 41 pages.

Office Action for U.S. Appl. No. 15/793,776, dated Sep. 30, 2018, Jones, "Determining Device Location", 33 pages.

Office Action for U.S. Appl. No. 15/793,776, dated Aug. 8, 2019, Jones, "Determining Device Location", 35 pages.

* cited by examiner

DETERMINING DEVICE LOCATION

CROSS REFERENCE TO RELATED APPLICATIONS

This is a continuation application which claims priority to commonly assigned, co-pending U.S. patent application Ser. No. 15/793,776, filed Oct. 25, 2017. Application Ser. No. 15/793,776 is fully incorporated herein by reference.

BACKGROUND

The ability to access emergency response services by dialing a reserved emergency telephone number, such as 911 in the United States, is a vital component of public safety and emergency preparedness. In the United States, the Federal Communications Commission (FCC) has established a set of rules and regulations that require mobile communication providers to deliver enhanced emergency services to their subscribers. In particular, mobile communication providers are required to provide a current location of a 911 caller to emergency services.

There are also many other situations where it is useful to know the location of a device. For example, certain device applications may provide services that depend on device location. As another example, advertising may be tailored to the current location of a device user.

In some cases, the location of a mobile device can be determined and reported by the mobile device itself, based on global positioning system (GPS) data. In these cases, the mobile device provides geographical coordinates of its location to the mobile communication provider. The mobile communication provider or associated entities can use this information to determine a street address, and may provide the street address to emergency services. However, GPS is not always accurate, particularly in locations with poor visibility of the sky such as many cities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
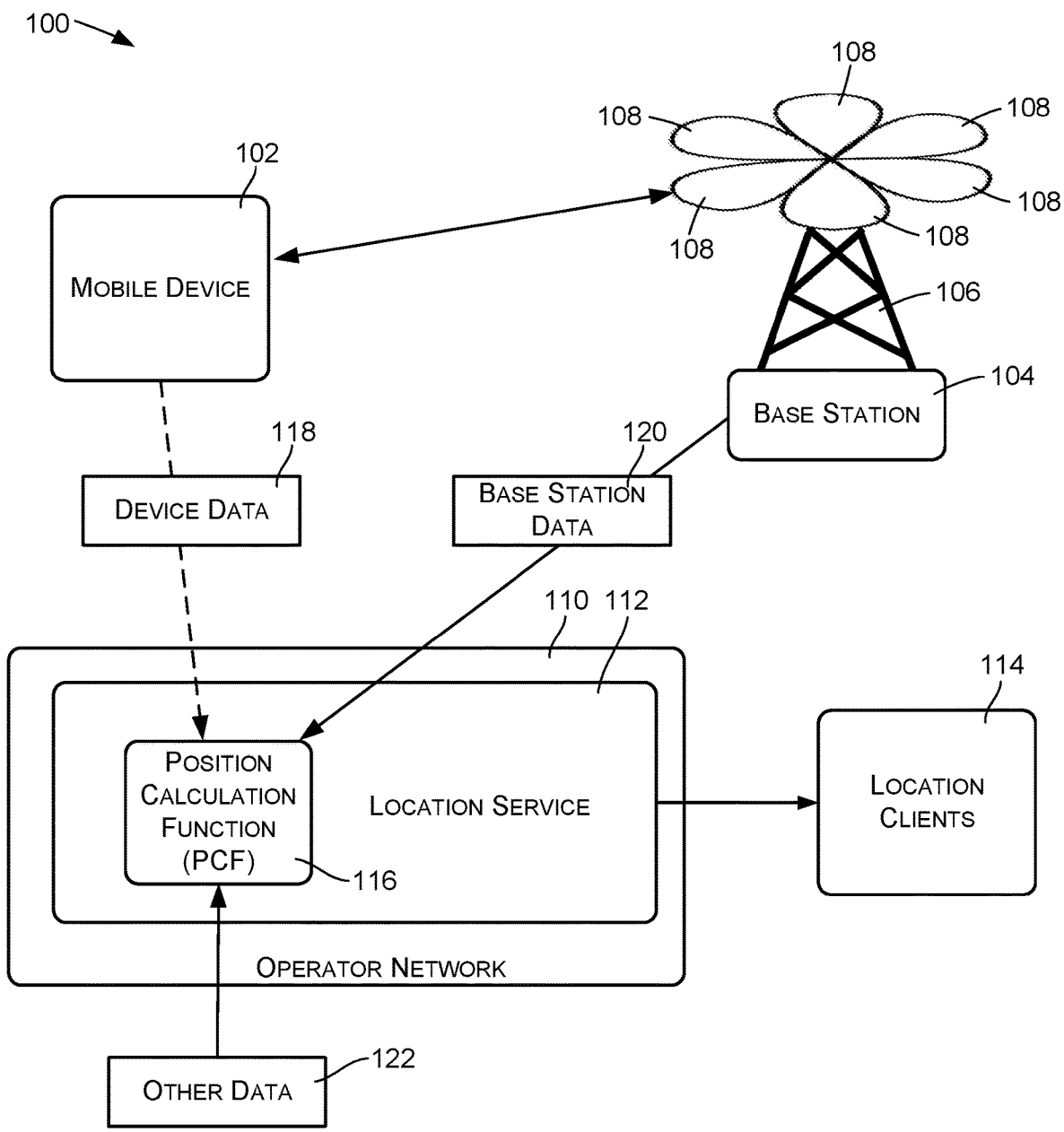
FIG. 1 is a block diagram of an environment that includes components for determining the location of a mobile device.

Described herein are techniques for determining locations of mobile communication devices for use by emergency service responders as well as by other entities and components that depend on device location and/or provide services based on device location.

In certain types of cellular communication networks, communications with mobile devices use directional wireless signals that are implemented using techniques referred to as beamforming. Specifically, a base station used in a cellular communications network may have an array of antennas that are used to form multiple directional signals, each of which extends in a different direction from the base station. This allows much more efficient use of limited bandwidth, and is particularly useful in higher frequency bands.

The directional signals are referred to as beams or signal beams. At any particular location, a mobile device monitors detectable beams and identifies the best beam, which is then used for communications between the base station and the mobile device. A moving device may use a continually changing sequence of different beams for communication with the cellular network.

Beamforming will be increasingly used in 5th-Generation (5G) mobile networks, although it may be used to some extent in 4th-Generation (4G) and Long-Term Evolution (LTE) mobile networks. Beamforming is particularly effective in higher frequency bands, such as the bands referred to as millimeter bands, which are in the spectrum between 30 GHz and 300 GHz. At these higher frequencies and corresponding short wavelengths, it becomes more feasible to deploy antenna arrays that can be used for beamforming. Although propagation distances are shorter when using these higher frequencies, the availability of beamforming allows more efficient use of the available spectrum.

Although the following discussion refers to use of certain techniques in high frequencies bands, the described techniques may also be used in other frequency bands, including lower frequency bands.

In some systems, beamforming may be used in the millimeter bands to supplement older technologies used in lower frequency bands. For example, a system may use 4G LTE technologies in lower frequency bands and use 5G beamforming techniques in the higher frequency bands.

Embodiments described herein use information that is based on beamforming, in addition to other information, to determine the location of a mobile device. The described techniques can be used in response to requests from location clients such as emergency services responders, IP Multimedia System (IMS) services, and various other applications and services that are based on user location.

In a system using beamforming, a base station may provide information regarding the beam that is being used for communications with a mobile device, and elements of the network may consider this information when determining the location of the mobile device. Specifically, the direction of the signal beam that is currently being used for communicating with the mobile device is considered when evaluating device location, under the assumption that the mobile device is within the area covered by the selected beam.

In some cases, beam selection for a mobile device may be recorded over some length of time, and the direction of the mobile device relative to the base station may be reported as the average direction of multiple beams that have been used for communicating with the mobile device over some previous time period.

In some cases, signal strength may also be evaluated to determine an estimated distance of the mobile device from the base station. Specifically, the strength of the signal received from the mobile device may be determined and used to estimate the distance, under the assumption that signal strength decreases with increasing distance. In these cases, the actual location of the mobile device may be determined or estimated based on the combination of beam direction and signal strength.

The directional information derived from beam selection and signal strength may be used to supplement other available information when determining device location. For example, a location determination may be based on a combination of data such as GPS coordinates, propagation times, signal strengths, and so forth, in combination with the directional information derived from beam selection.

Location information may be used for many applications, of which emergency services is one example. For example, an emergency services responder or Public Safety Access Point (PSAP) may request the location of a mobile device in response to receiving an emergency call, such as a 911 call in the United States or another reserved number in a different part of the world, from the mobile device. As another example, device location information may be used to select advertising and notifications that are appropriate to the current location of a user of the mobile device. As another example, various device applications may use location information, such as mapping and weather applications. As another example, many social networking applications record and report users' locations, in a process referred to as "check-in."

In a hybrid system in which both 4G/LTE and 5G technologies are used, there may be times when a mobile device is not utilizing beamformed signals. For example, a mobile device may be communicating using LTE technologies that do not implement beamforming. Upon receiving a location request, however, the hybrid system may initiate 5G beamformed-based communications with the mobile device so that the location of the mobile device relative to a base station may be determined.

FIG. 1 illustrates an example environment 100 within which the described techniques may be implemented. In FIG. 1, a mobile device 102, also referred to as user equipment or a UE, communicates with a base station 104. The mobile device 102 may comprise any type of device capable of wireless communications with the base station 104, such as a cell phone, a smartphone, a computer, a tablet computer, an automotive control/monitoring system, etc.

The base station 104 comprises equipment that is most often in a fixed location and that includes transceivers and antennas for communicating with multiple mobile devices. In the illustrated example, the base station 104 includes a tower 106 upon which are mounted multiple antennas (not shown) that are used for beamforming.

FIG. 1 illustrates a simplified example of signal beams 108 that may be formed by the base station 104. Each beam 108 extends in a respectively unique radial direction relative to the base station 104, although there may be some overlap of adjacent beams. Although FIG. 1 shows six formed signal beams for purposes of illustration, certain embodiments may have many more signal beams, such as 20 to 100 signal beams, each of which is directed in a different direction.

In FIG. 1, the beams 108 are shown as being in different horizontal directions. That is, each beam corresponds to an azimuth or a range of azimuths. However, signal beams may also vary in a vertical direction or angle, which is referred to as tilt or elevation. A beam may have an uptilt, meaning that the beam is angled upward relative to horizontal, or a downtilt, meaning that the beam is angled downward relative to horizontal.

In operation, the mobile device 102 and the base station 104 communicate to select one of the signal beams 108. For example, the mobile device 102 may determine the beam 108 having the strongest or highest quality signal, and/or may report signal strengths of different beams 108 to the base station 104. Communications between the mobile device 102 and the base station 104 are then conducted using a designated beam. The mobile device 102 continually monitors signal strengths of received beams, and beam selection may change as the mobile device 102 moves geographically.

During normal operations, the mobile device 102 communicates through the base station 104 with an operator network 110, which may include a network core such as an Evolved Packet Core (EPC) or a 5G core, as well as various associated services such as an IP Multimedia System (IMS) (not shown). For purposes of this discussion, the term "operator network" is used to describe portions of a cellular communication system other than its Radio Access Network (RAN). The RAN of the cellular communication system includes multiple base stations such as the base station 104.

The operator network 110 may implement a location service 112 that can be queried by multiple location clients 114. In response to a query regarding a specific mobile device, the location service 112 provides an estimation of the mobile device's current location. In some embodiments or environments, the location service 112 may be referred to as Serving Mobile Location Center (SMLC), as a Gateway Mobile Location Center (GMLC), or as a Secure User Plan Location (SUPL) service, although the location service 112 can be implemented in other ways and may use different standards or protocols.

The location clients 114 may comprise any of various devices, components, and/or entities. For example, location clients may include Public Safety Access Points (PSAPs) or other entities that receive, process, and/or respond to emergency calls such as 911 calls. Other location clients may include web services, device applications, and so forth. Note that in some cases, the mobile device 102 itself may query the location service 112 in order to determine its own location, and may therefore be a location client.

In practice, there may be additional components, systems, and/or functions within the operator network 110 for receiving and responding to location requests. For example, the operator network 110 may use standardized functions, protocols, and communication channels for receiving and responding to emergency service requests, including 911 related location requests. Note that while the number 911 is reserved as an emergency reporting number in the United States, other numbers are used in other countries.

Additional functions, protocols, or communication channels may be used within the operator network 110 for receiving and responding to requests from other entities, such as requests of an IMS of the operator network 110 or requests from the mobile device itself.

Upon receiving a location request regarding the mobile device 102, the location service 112 determines the current location of the mobile device 102 using what is referred to for purposes of discussion as a Position Calculation Function (PCF) 116. The PCF 116 calculates the current location based on various data, which may include device data 118 and base station data 120. The PCF 116 may in some embodiments perform such an analysis using a Kahlman filter, which determines appropriate weightings for the different data based on various factors.

Note that although the device data 118 is indicated by a dashed line to be provided from the mobile device 102 to the PCF 116, actual communications between the mobile device 102 and the operator network 110 are performed through the base station 104.

The device data 118 comprises data that originates from and/or is provided by the mobile device 102. The device data 118 may include location information that comprises any one or more of the following, as examples:

global positioning system (GPS) data;
  global navigation satellite system (GLONASS) data;
  geographic coordinates;
  a cell ID;
  wi-fi access point data;
  time-difference of arrival data;
  timing advance data;
  distance data;
  signal strength data; and
  a strength of the signal between the base station and the mobile device 102.

The mobile device 102 may provide a cell ID to identify the base station 104 that the mobile device 102 is using for access to the operator network 110. The cell ID may be compared to a database indicating locations of base stations corresponding to different cell IDs in order to provide a rough estimation of the location of the mobile device 102, under the assumption that the mobile device 102 is within range of the base station 104.

Wi-Fi access point data may in some cases be used as a factor in determining the location of the mobile device 102. For example, the mobile device 102 may report the name of any currently detectable Wi-Fi access points and the strengths of signals received from those Wi-Fi access points. This information may be compared to a database of known access point locations to determine or refine the location of the mobile device 102.

In some cases or embodiments, timing data, such as time-difference of arrival (TDOA) and/or timing advance data, may be used when determining the location of the mobile device 102. TDOA and timing advance data relate to the propagation time of signals between the base station 104 and the mobile device 102, and can be used to produce distance data that indicates the distance of the mobile device 102 from the base station 104. The strength of the signal between the mobile device 102 and the base station 104 can also be used as an indication of distance between the mobile device 102 and the base station 104.

The base station data 120 originates from and/or is provided by the base station 104. The base station data 120 may include information that is similar or in addition to the device data 118, such as any one or more of the following:

time-difference of arrival data;
  timing advance data;
  distance data;
  signal strength data;
  cell ID;
  currently selected beam for communicating with the mobile device 102;
  direction of the currently selected beam;
  azimuth of the currently selected beam;
  elevation or tilt of the currently selected beam;
  physical coordinates of the base station;
  height or altitude of the base station antenna;
  a current direction of the mobile device 102 relative to the base station, based on the current beam selection of the mobile device 102;
  a current azimuth of the mobile device 102 relative to the base station, based on the current beam selection of the mobile device 102;
  a current elevation of the mobile device 102 relative to the base station, based on the current beam selection of the mobile device 102
  a strength of the signal between the base station and the mobile device 102; and
  a distance of the mobile device 102 from the base station, based on the strength of the signal between the base station and the mobile device 102.

Any or all of the device data 118 and the base station data 120 may be used by the PCF 116 when calculating the location of the mobile device 102.

The current location of the mobile device 102 can be determined based on the cell ID and corresponding physical location of the base station 104 with which the mobile device 102 is communicating, as well as which of the beams 108 has been selected for communications between the mobile device 102 and the base station 104. More specifically the location of the mobile device may be estimated based on a combination of the location of the base station, the azimuth and elevation of the currently used beam, the antenna height and orientation, and signal strength. In some implementations, databases are maintained and referenced to obtain some or all of this information.

In some implementations, the location of the mobile device 102 is calculated based on a variety of data, and the data derived from beam selection is used to enhance the accuracy of location determinations. The direction of the currently selected beam, as well as the current direction of the mobile device relative to the base station 104, can be determined by the base station 104 or by the location service 112.

Note that the base station data 120 includes information that may also be included in the device data 118 or that may be similar to items of the device data 118. Certain items of information may be determined and provided by either or both the mobile device 102 and the base station 104.

In some cases or embodiments, the device data 118 and the base station data 120 may be provided to the location service 112 in response to specific queries by the location service 112 and/or the location clients 114. In other cases or embodiments, the device data 118 and the base station data 120 may be provided to the location service 112 and/or PCF 116 repeatedly or continuously as part of normal communications with the mobile device 102, and the location service 112 may track the location of the mobile device over time.

The PCF 116 may calculate an actual location of the mobile device 102 in various ways, depending on the data that is available and the reliability of the different types of data. Furthermore, the calculation may be based on other data 122, in addition to the data described above. Such other data may be received from the mobile device 102, the base station 104, and/or other components of the cellular communications network.

In some cases, GPS information alone may be sufficient to determine the location of the mobile device 102. In other cases, however, the GPS data may be unavailable or relatively imprecise, and the location of the mobile device 102 may be additionally, or alternatively, based at least in part on data other than GPS data. As one example, the location of the mobile device 102 might be determined by finding the distance of the mobile device 102 from the base station 104 and the direction of the mobile device 102 relative to the base station 104. The distance may be determined based on one or more of various types of information, such as the relative strength of the signal received from the mobile device 102 and/or the propagation time of signals between the mobile device 102 and the base station 104. The direction may be determined as described above, by identifying which of the signal beams 108 is currently being used for communications with the mobile device and looking up the direction of the identified signal beam 108. The mobile device 102 is then assumed to be within a sector that corresponds to the coverage area of the identified signal beam 108.

Figure 2:
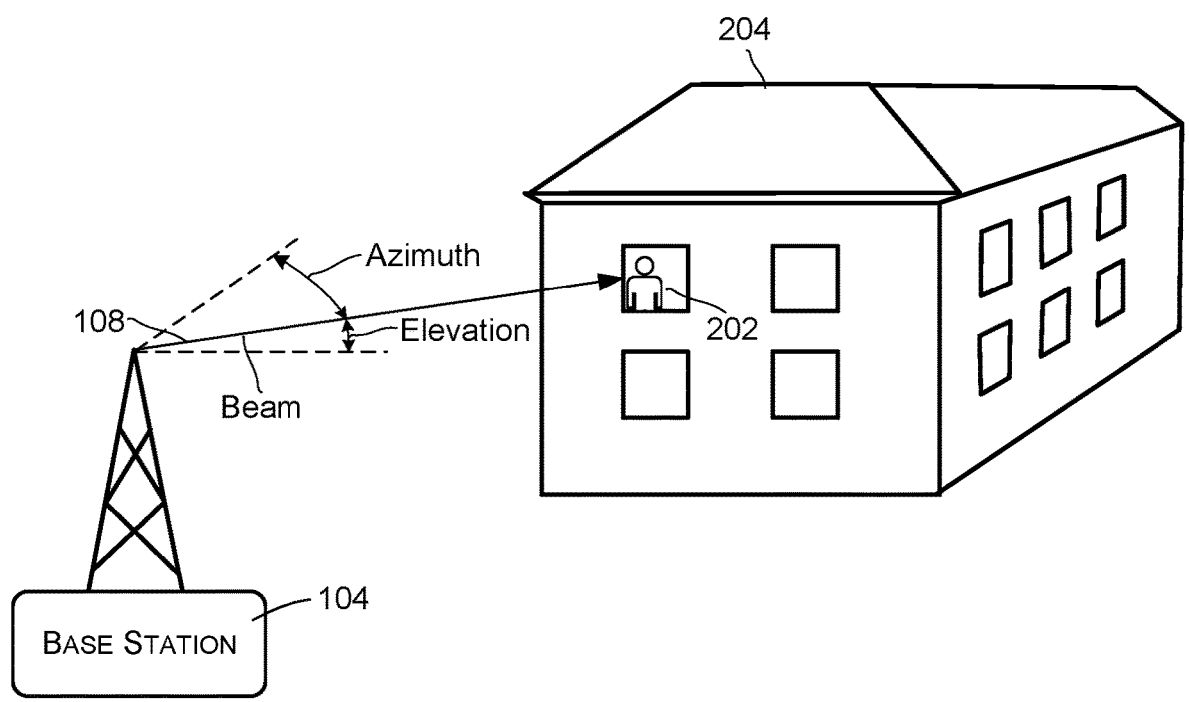
FIG. 2 illustrates the use of a directional signal beam for communicating between a base station and a mobile device.

FIG. 2 illustrates characteristics of a beam 108 that may be used to determine the location or direction of a mobile device carried by a user 202. In this example, the user 202 is on the second floor of a building 204. The beam 108 extends from a directional antenna (not shown) of the base station 104. The elevation and azimuth of the beam are illustrated in FIG. 2.

The user 202 is shown within an upper left window of the building 204. If the user were to move to the lower right window, a different beam might be used, and the different beam might have a different azimuth and/or elevation.

Figure 3:
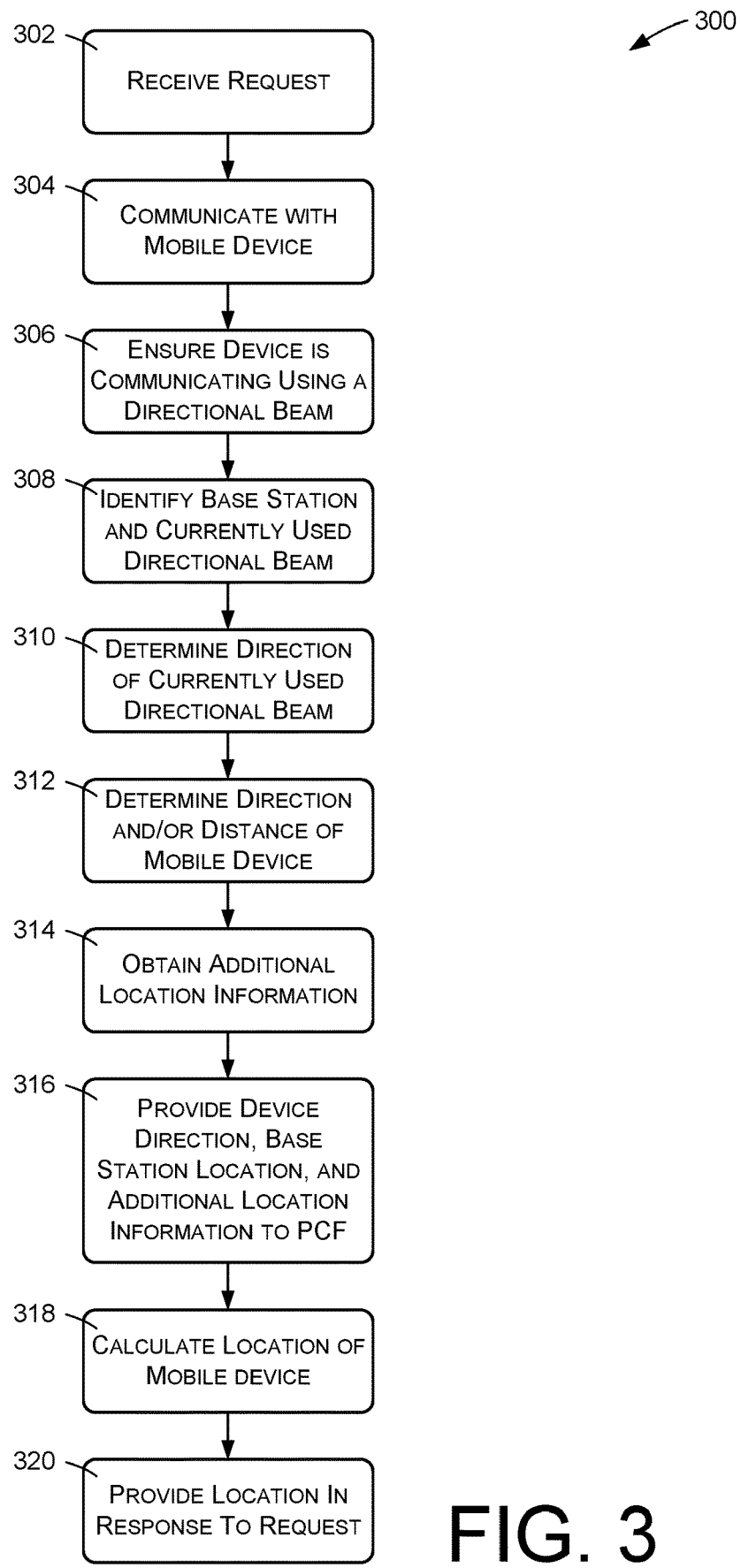
FIG. 3 is a flow diagram illustrating an example method of determining the location of a mobile device.

FIG. 3 shows an example method 300 of determining and providing the location of a mobile device, in a mobile communication system having multiple base stations or other access points. The example method 300 is described with reference to the environment 100 of FIG. 1, although the method may also be used in other environments.

An action 302 comprises receiving a request for the location of the mobile device 102. In certain embodiments, subsequent actions of FIG. 3 may be performed in response to receiving such a request.

The request may be made by or on behalf of an emergency services provider. For example, the request may be received from a Public-Safety Access Point (PSAP). In other cases, the request may come from some other entity that provides services or functionality based on location, such as from an IP Multimedia Subsystem (IMS) of the operator network 110. In some embodiments, the request may be made by the mobile device 102.

An action 304 comprises communicating wirelessly with the mobile device 102 through the base station 104. As described above, the base station 104 uses multiple directional beams 108 for wirelessly communicating with mobile devices such as the mobile device 102. Generally, communications with the mobile device 102 use the directional beam having the highest signal strength or quality, measured at either or both of the device 102 and the base station 104. This may change over time, and communications with the device 102 may use a number of different beams over time. The device 102 may also move among base stations and may communicate using different base stations.

Communications using the directional beams 108 include communications used for active data communication sessions as well as other communications that may occur in the background even when the mobile device 102 is otherwise idle.

An action 306 comprises ensuring that the mobile device 102 is communicating with the base station 104 using beamformed signals. For example, in some embodiments the mobile device may at times communicate using LTE or other systems that do not utilize beamforming. The action 206, which may in some cases be performed in response to receiving a location request, comprises causing the mobile device 102 to communicate with the base station 104 using one of the directional beams 108. In some hybrid environments, this may involve switching the mobile device 102 to a 5G network that uses beamforming.

An action 308 comprises identifying or receiving an identification of the base station 104 through which the mobile device 102 is communicating, as well as identifying or receiving an identification of the directional beam 108 currently being used for communications between the mobile device 102 and the base station 104. This directional beam will be referred to below as the currently used directional beam. This information may be received from the base station 104 or may be derived from information known to the operator network 110.

An action 310 comprises determining or otherwise identifying a direction of the currently used directional beam. Information regarding the directions of the beams of multiple base stations may be maintained in one or more databases. More specifically, the base station 104 may be identified in terms of a cell ID or other identifier associated with the base station, and the currently selected beam may be specified as a beam number or index. A database may store geographic coordinates of each base station, referenced by cell ID. For example, the database might indicate the height of a directional antenna being used, the orientation of the directional antenna, a direction corresponding to each beam, the geographical coordinates of the base station, etc. The direction of the currently used directional beam may be specified as a geographic azimuth, or in any other suitable format. In some embodiments, the direction may also be specified to include the elevation or tilt of the directional beam.

An action 312 comprises determining or otherwise identifying a device direction relative to the base station location. The device direction is the assumed direction of the mobile device 102 relative to the location of the base station 104, and may in some cases be determined as being equivalent to the direction of the currently used directional beam. In other cases or embodiments, the device direction may be calculated as an average direction of multiple directional beams 108 that have been used over a previous time period for communications between the mobile device 102 and the base station 104. In some cases, the action 312 may include determining the distance of the mobile device 102 from the base station 104 based on signal strength measurements.

An action 314 comprises receiving additional location information, in addition to the base station location, such as antenna height and orientation, location of the base station, the direction of the device relative to the base station, etc. The additional location information may include the device data 118 and base station data 120 as described above, and may also include other types of data from various sources.

An action 316 comprises providing the device direction, the base station location, and any other additional location information to the PCF 116 for determination of the location of the mobile device, which is referred to herein as the mobile device location. As mentioned above, the action 316 may include providing the tilt of the currently used directional beam to the PCF 116. The action 316 may also providing signal strength and quality data.

An action 318 comprises calculating or otherwise determining an estimated location of the mobile device based on the provided location information, including the device direction, the base station location, the antenna height and orientation, and any other relevant and available data. In the embodiment described herein, the action 318 is performed by the PCF 116, although any of various components of a cellular communications network or other network may be used to calculate the location of the mobile device based on the information described above.

An action 320 comprises, in response to receiving the request of action 302, providing the mobile device location to the requesting entity, such as to an emergency services responder, a PSAP, or any other component or entity authorized to receive location information of the mobile device 102, including the mobile device itself.

Figure 4:
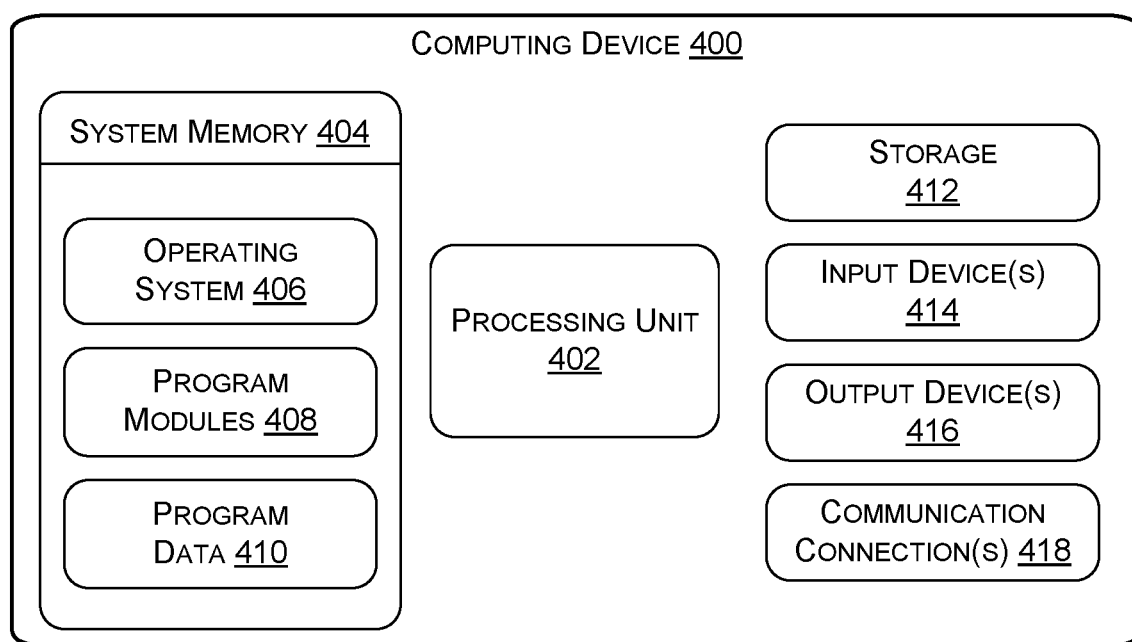
FIG. 4 is a block diagram of an example computing device, one or more of which can be used to implement various of the components and functionality described herein.

FIG. 4 is a block diagram of an illustrative computing device 400 such as may be used to implement various components or functions of the environment 100, such as servers, routers, gateways, administrative components, etc. For example, one or more computing devices 400 may be used to implement the location service 112, the PCF 116, elements of the base station 104, etc.

In various embodiments, the computing device 400 may include at least one processing unit 402 and system memory 404. Depending on the exact configuration and type of computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices 412 (removable and/or non-removable) such as, for example, magnetic disks, optical disks, or tape. The storage devices 412 may also include network-based memory or storage.

Non-transitory computer storage media of the computing device 400 may include volatile and nonvolatile, removable and non-removable media implemented in any method or technology for storage of information, such as computer readable instructions, data structures, program modules, or other data. The system memory 404 and storage devices 412 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 400. Any such non-transitory computer-readable storage media may be part of the computing device 400.

In various embodiment, any or all of the system memory 404 and storage devices 412 may store programming instructions which, when executed, implement some or all of the function functionality described above as being implemented by the location service 112, the PCF 116, and the certain aspects of the base station 104.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices.

Although features and/or methodological acts are described above, it is to be understood that the appended claims are not necessarily limited to those features or acts. Rather, the features and acts described above are disclosed as example forms of implementing the claims.

The invention claimed is:

1. A mobile device, comprising:
   at least one processor; and
   memory storing instructions that, when executed by the at least one processor, cause the at least one processor to perform operations comprising:
      communicating wirelessly, at a location of the mobile device, with a first base station of a plurality of base stations;
      switching, to a second base station of the plurality of base stations that uses beamforming, based at least in part on the first base station not using directional beams for communicating wirelessly with the mobile device and in response to a request for the location of the mobile device;
      monitoring a set of multiple directional beams formed by the second base station to communicate wirelessly with the second base station, the location of the mobile device being determined by the second base station based at least in part on the set of multiple directional beams;
      conducting communications with the second base station using, as a designated beam, a directional beam designated from among the set of multiple directional beams; and
      receiving, from the second base station, the location determined further based at least in part on a direction of the mobile device and on an average tilt of the set of multiple directional beams.

2. The mobile device of claim 1, the set of multiple directional beams by which the mobile device communicates wirelessly being used by the second base station to identify the location of the mobile device based at least in part on at least one of mobile device data and base station data, the mobile device data comprising data of the mobile device, the base station data comprising an elevation of a selected beam of the set of multiple directional beams.

3. The mobile device of claim 1, the set of multiple directional beams by which the mobile device communicates wirelessly being used by the second base station to identify the location of the mobile device based at least in part on a position calculation function, the position calculation function being determined by the second base station based at least in part on at least one of mobile device data and base station data, the mobile device data comprising data of the mobile device, the base station data comprising an elevation of the mobile device with respect to the second base station.

4. The mobile device of claim 3, the mobile device data comprising one or more of:
   global positioning system (GPS) data;
   global navigation satellite system (GLONASS) data;
   geographic coordinates;
   a cell ID;
   wi-fi access point data;
   time-difference of arrival data;
   timing advance data;
   distance data;
   signal strength data; or
   a strength of a signal between the second base station and the mobile device.

5. The mobile device of claim 1, the set of multiple directional beams by which the mobile device communicates wirelessly being used by the second base station to identify the location of the mobile device based at least in part on a position calculation function, the position calculation function being determined by the second base station based at least in part on a strength of a signal used between the mobile device and the second base station.

6. The mobile device of claim 1, wherein the request for the location of the mobile device is received on behalf of an emergency services responder.

7. The mobile device of claim 6, the location of the mobile device being determined by the second base station further based at least in part on a strength of a signal used between the mobile device and the second base station.

8. The mobile device of claim 1, the operations further comprising:

transmitting a second request for the location of the mobile device, wherein the location is received from the second base station based at least in part on the second request.

9. A method comprising:

communicating wirelessly, at a location of a mobile device, with a first base station of a plurality of base stations;

switching, to a second base station of the plurality of base stations that uses beamforming, based at least in part on the first base station not using directional beams for communicating wirelessly with the mobile device and in response to a request for the location of the mobile device;

monitoring a set of multiple directional beams formed by the second base station to communicate wirelessly with the second base station, the location of the mobile device being determined by the second base station based at least in part on an average tilt of the set of multiple directional beams;

conducting communications with the second base station using, as a designated beam, a directional beam designated from among the set of multiple directional beams; and receiving, from the second base station, the location determined further based at least in part on a direction of the mobile device and on the average tilt of the set of multiple directional beams.

10. The method of claim 9, the set of multiple directional beams by which the mobile device communicates wirelessly being used by the second base station to identify the location of the mobile device based at least in part on at least one of mobile device data and an elevation of the mobile device, the mobile device data comprising data of the mobile device.

11. The method of claim 9, the set of multiple directional beams by which the mobile device communicates wirelessly being used by the second base station to identify the location of the mobile device based at least in part on at least one of mobile device data and an elevation of the mobile device, the mobile device data comprising data of the mobile device.

12. The method of claim 9, the set of multiple directional beams by which the mobile device communicates wirelessly being used by the second base station to identify the location of the mobile device based at least in part on a strength and propagation time of a signal used between the mobile device and the second base station.

13. The method of claim 12, the set of multiple directional beams by which the mobile device communicates wirelessly being used by the second base station to identify the location of the mobile device based at least in part on a position calculation function, the position calculation function being determined by the second base station based at least in part on distance data, the distance data determined based at least in part on the strength and propagation time of the signal.

14. The method of claim 9, the set of multiple directional beams by which the mobile device communicates wirelessly being used by the second base station to identify the location of the mobile device based at least in part on mobile device data, the mobile device data comprising data of the mobile device, wherein the mobile device data further comprises one or more of:

global positioning system (GPS) data;
global navigation satellite system (GLONASS) data;
geographic coordinates;
a cell ID;
wi-fi access point data;
time-difference of arrival data;
timing advance data;
distance data;
signal strength data; or
a strength of a signal between the second base station and the mobile device.

15. The method of claim 9, the set of multiple directional beams by which the mobile device communicates wirelessly being used by the second base station to identify the location of the mobile device based at least in part on a position calculation function.

16. The method of claim 9, further comprising:

transmitting a second request for the location of the mobile device, wherein the location is received from the second base station based at least in part on the second request.

17. A mobile device, comprising:

at least one processor; and memory storing instructions that, when executed by the at least one processor, cause the at least one processor to perform operations comprising:

communicating wirelessly, at a location of the mobile device, with a first base station of a plurality of base stations;

switching, to a second base station of the plurality of base stations that uses beamforming, based at least in part on the first base station not using directional beams for communicating wirelessly with the mobile device and in response to a request for the location of the mobile device;

monitoring a set of multiple directional beams formed by the second base station to communicate wirelessly with the second base station, the location of the mobile device being determined by the second base station based at least in part on mobile device data and a position calculation function;

conducting communications with the second base station using, as a designated beam, a directional beam being designated from among the set of multiple directional beams; and receiving, from the second base station, the location determined further based at least in part on a direction of the mobile device and on an average tilt of the set of multiple directional beams.

18. The mobile device of claim 17, the position calculation function being determined by the second base station based at least in part on at least one of the mobile device data, and an elevation of the mobile device with respect to the second base station.

19. The mobile device of claim 17, the position calculation function being determined by the second base station based at least in part on a strength of a signal used between the mobile device and the second base station.

20. The mobile device of claim 17, the operations further comprising:

transmitting a second request for the location of the mobile device, wherein the location is received from the second base station based at least in part on the second request.

* * * * *